United States Patent [19]

Harvey

[11] Patent Number: 5,089,668
[45] Date of Patent: Feb. 18, 1992

[54] TOWABLE BUOYANT STREAMER FOR DATA BEARER

[75] Inventor: Anthony P. Harvey, Burwood, Australia

[73] Assignee: Plessey Australia Pty. Limited of Faraday Park, Meadowbank, Australia

[21] Appl. No.: 437,796

[22] Filed: Nov. 17, 1989

[30] Foreign Application Priority Data

Nov. 18, 1988 [AU] Australia ............... PJ1516

[51] Int. Cl.⁵ ............................ H01B 7/12
[52] U.S. Cl. ...................... 174/101.5; 367/20; 367/106; 367/130; 367/144; 367/154
[58] Field of Search ............ 174/101.5; 367/20, 106, 367/130, 144, 154

[56] References Cited

U.S. PATENT DOCUMENTS

| | | | |
|---|---|---|---|
| 3,710,006 | 1/1973 | Davis | 174/101.5 |
| 3,766,307 | 10/1973 | Andrews, Jr. | 174/101.5 X |
| 4,011,540 | 3/1977 | Farr | 174/101.5 X |
| 4,399,322 | 8/1983 | Hafner, Jr. | 174/101.5 |
| 4,402,069 | 8/1983 | Miller et al. | 367/130 X |
| 4,597,065 | 6/1986 | Lien et al. | 367/20 |
| 4,809,243 | 2/1989 | Bledsoe et al. | 367/154 |

*Primary Examiner*—Morris H. Nimmo
*Attorney, Agent, or Firm*—Cushman, Darby & Cushman

[57] ABSTRACT

A towed streamer having a buoyant core, a data bearer layer surrounding the buoyant core, an inner jacket layer formed of a resilient material surrounding the data bearer layer, and an outer jacket layer surrounding the inner jacket layer, wherein a series of longitudinally positioned strength members are embedded in the inner jacket layer to extend along the streamer to transmit tension along the streamer while the streamer is held in the inner jacket layer.

19 Claims, 4 Drawing Sheets

TOWABLE BUOYANT STREAMER FOR DATA BEARER

BACKGROUND OF THE INVENTION

This invention relates to improvements in and to the streamers and a method for manufacturing them.

Towed streamers and arrays are known in the art and usually comprise and elongated buoyant streamer having spaced along its length the required payload and provided with strength members longitudinally extending to take the towing strain when the streamer is towed.

It is necessary for towed streamers to be constructed to allow them to be winched onto a bollard or the like and problems generally encountered in these streamers is to maintain the necessary spacing of the strength members and to withstand the operational tensions during towing and winching.

It will be appreciated that the spacing and support of the strength members is important because, should these members be displaced by forces applied when winching, the strength and the streaming ability will be deteriorated, the streaming ability being an important feature, together with the bouyancy, in towed streamers.

The payload of a streamer is generally of an electronic nature and therefore requires signal transmission means extending along the array, and as known from prior art, sometimes in the form of braided signal transmission lines.

SUMMARY OF THE INVENTION

The object of the present invention is to provide an effective towed streamer which will have the required operational characteristics and strength and which will be of relatively simple construction, the method of construction consisting in the assembly of the strength members in an inner jacket layer surround an inner assembly comprising a resilient core and a surrounding data layer, the inner jacket layer being itself surrounded by an outer jacket layer, the inner jacket layer maintaining the position of the strength members.

The invention thus comprises an inner assembly comprising a buoyant core and a data bearer layer having a wrap surrounded by strength members suitably supported in spaced relationship around the inner assembly and carried within an inner jacket layer which is housed within an outer protective project layer, the inner jacket layer forming a means to position the strength members.

A feature of the invention is the use of two separate jacket layers namely an inner jacket, layer supporting the strength members and an outer jacket layer over the inner jacket layer. These may be extruded one over the other using, for instance, two concentric extrusion nozzles in a single extrusion pass, or the jacket construction can comprise an outer jacket layer of one material extruded over an inner jacket layer of another material applied sequentially as a separate extrusion process.

The inner assembly formed by the core and data bearer layer and wrap preferably contains a gel to fill voids.

The invention thus in a preferred embodiment, provides an towed streamer comprising a buoyant core, a data bearer layer surrounding the buoyant core, an inner jacket layer formed of a resilient material surrounding the data bearer layer, an outer jacket layer surrounding, the inner jacket layer, and a series of longitudinally positioned strength member embedded in the inner jacket layer and extending along the streamer to transmit tension along the streamer. A spacing layer is positioned between the strength members and the inner assembly.

The method of forming a towed streamer preferably includes forming an inner assembly comprising a buoyant core and a surrounding data bearer layer, positioning a series of longitudinally spaced extending strength members around the inner assembly in a radially spaced relationship to the inner assembly, forming an inner jacket around the strength member to space the strength member from the inner assembly, and enclosing the inner jacket layer in an outer jacket layer.

The invention provides an arrangement which allows the load to be transmitted across an interface between the jacket layers and the streamer strength members, which interface provides the primary load path between winching loads applied to the outside of the jacket layer and the streamer strength members.

The strength members within the streamer structure, which carry the primary longitudinal loads imposed by operational deployment, consist of longitudinally placed cords of a high tensile material such as that known under the trade mark "Kevlar".

The streamer may be used either as a tow section or an array section of a towed streamer.

BRIEF DESCRIPTION OF THE DRAWING

The actual construction of the array can be substantially varied, but to enable the nature of the invention to be fully appreciated, selected forms will now be described with reference to the accompanying drawings which are of an illustrative nature only and are not to be taken as limiting the invention to the specific forms shown.

In the drawings.

Throughout the drawings, similar components are given similar reference numerals.

DETAILED DESCRIPTION

Figure 1:
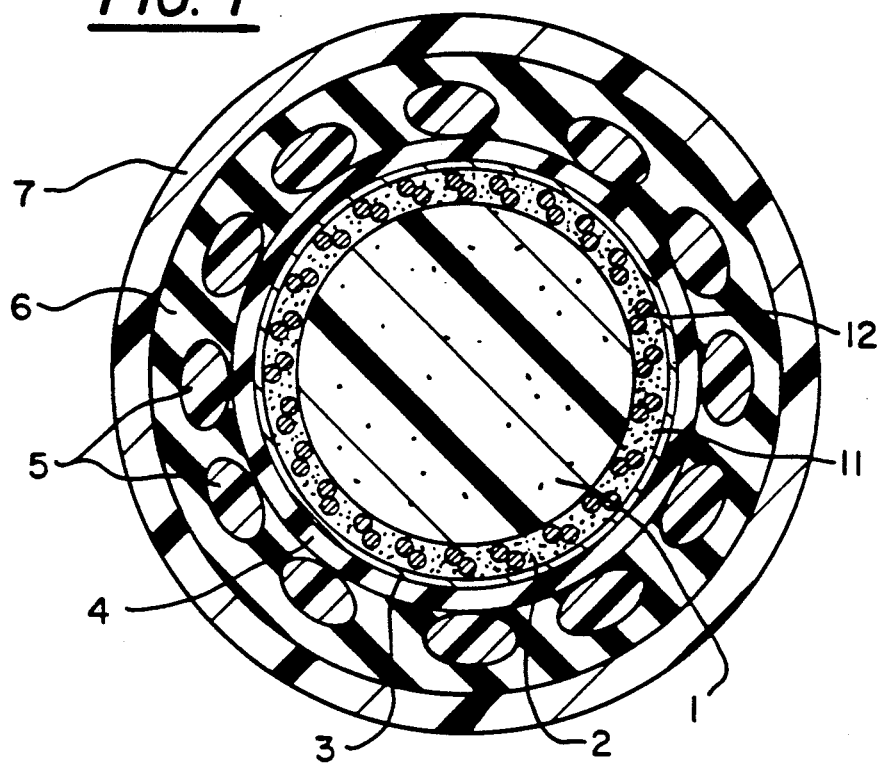
FIG. 1 shows schematically a transverse cross-section of a streamer comprising an inner assembly formed by a low density polymer surrounded by a data bearer layer covered by a paper wrap, and around this inner assembly are positioned a series of flattened strength members which are longitudinally extending, these being supported in an inner jacket layer which defines the spacing and is surrounded by an outer jacket layer which forms the interface with the medium in which the streamer is to be used, the strength members being positioned adjacent to the inner assembly but spaced therefrom by a thermo-plastic rubber (TPR) spacing layer.
Figure 2:
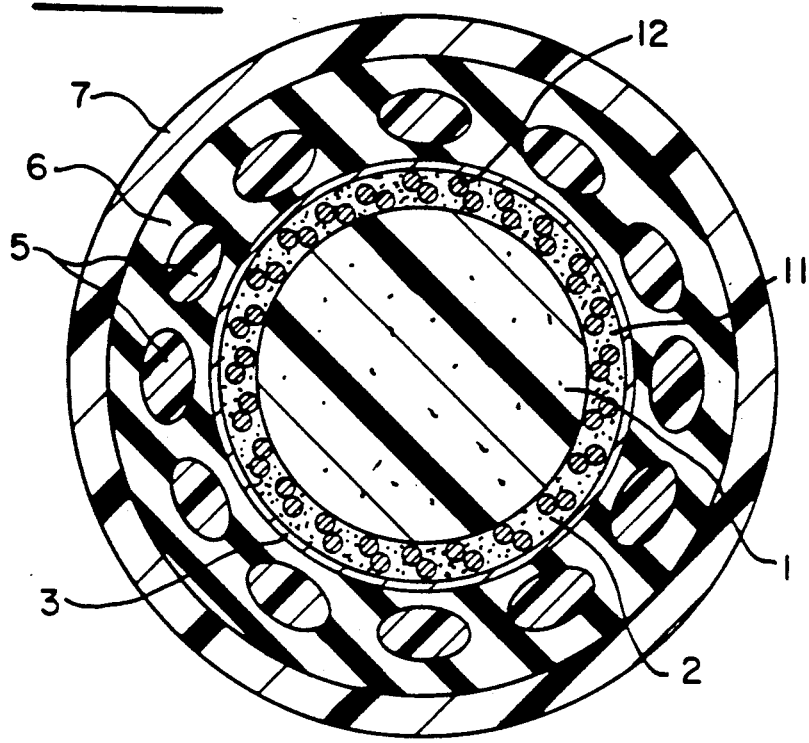
FIG. 2 shows a similar arrangement, but with the strength members embedded in the inner jacket layer but spaced from the inner assembly defined by the core and data bearer assembly and wrap, no spacing layering being used to initially space the strength members from the inner assembly.

Referring first to FIGS. 1 and 2, the inner assembly is shown comprising the core 1, the data bearer layer 2 and the paper wrap 3. It is centrally positioned in the streamer, the core 1 forming a support for the data layer 2, which serves to transmit electronic information from modules carried by the core when the streamer forms tow means for an array, or itself forms an array.

In FIG. 1 a spacing layer 4 of thermo-plastic rubber or a similar material is positioned over the inner assembly, and over this are placed the strength members 5.

Formed over the spacing layer 4 and the strength members 5 is an inner jacket layer 6 which is formed of thermo-plastic rubber or similar medium and over this is placed the outer jacket layer 7. The strength members 5 are shown flattened by passing them through a multiple head die immediately prior to the application of the TPR inner jacket layer 6.

The construction outlined isolates the core assembly from the strength members through the spacing layer 4 but as shown in FIG. 2 this spacing layer 4 may be omitted and the strength members simply embedded in the inner jacket layer 6 remote from the paper wrap, being held in this position by any means during the potting operation in the inner jacket member.

Figure 3:
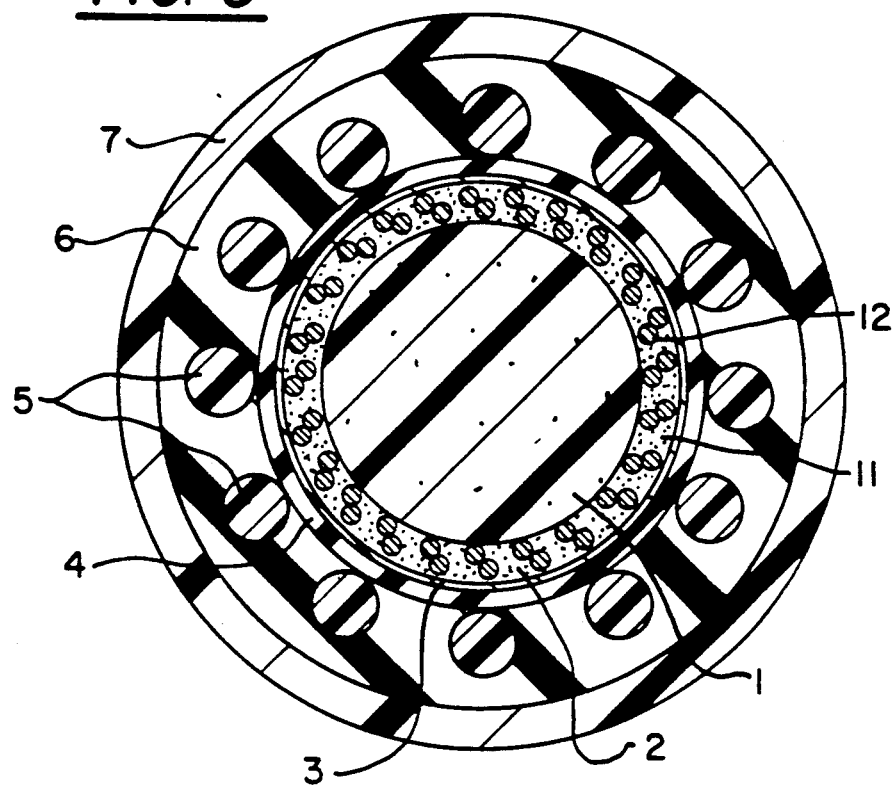
FIG. 3 is a view similar to FIG. 1, but showing strength members of circular transverse cross-section, again spaced from the inner assembly by a spacing layer.
Figure 4:
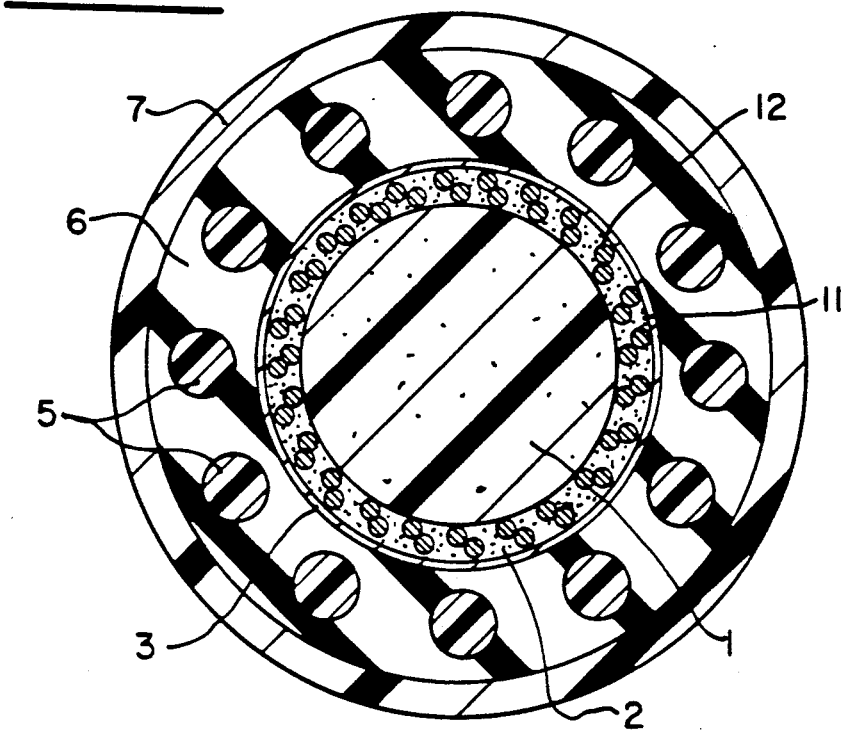
FIG. 4 is a view similar to FIG. 3, but showing the strength members positioned in the inner jacket without a spacing layer.

FIGS. 3 and 4 correspond to FIG. 1 and FIG. 2 respectively, but show, instead of the flattened strength members 5, the use of strength members 5 of circular cross-section held in the inner jacket layer 6 in the same manner as described with reference to FIGS. 1 and 2.

Figure 5:
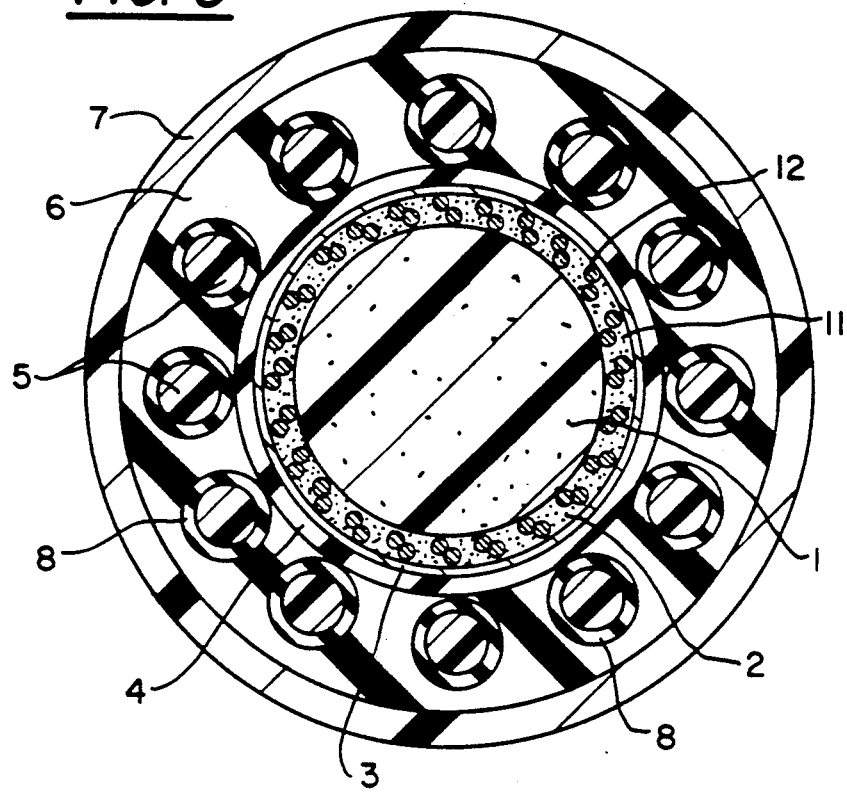
FIGS. 5, 6 and 7 show modified forms in which the strength members are pre-coated to include a spacing layer prior to being embedded in the inner jacket member, FIG. 5 showing the coated strength members radially spaced by a spacing layer, FIG. 6 omitting the spacing layer with the coated strength member lying against the paper wrap, and FIG. 7 showing the strength members supported in the inner jacket itself, clear of the inner assembly. It would be so held during its embedding in the inner jacket member.
Figure 6:
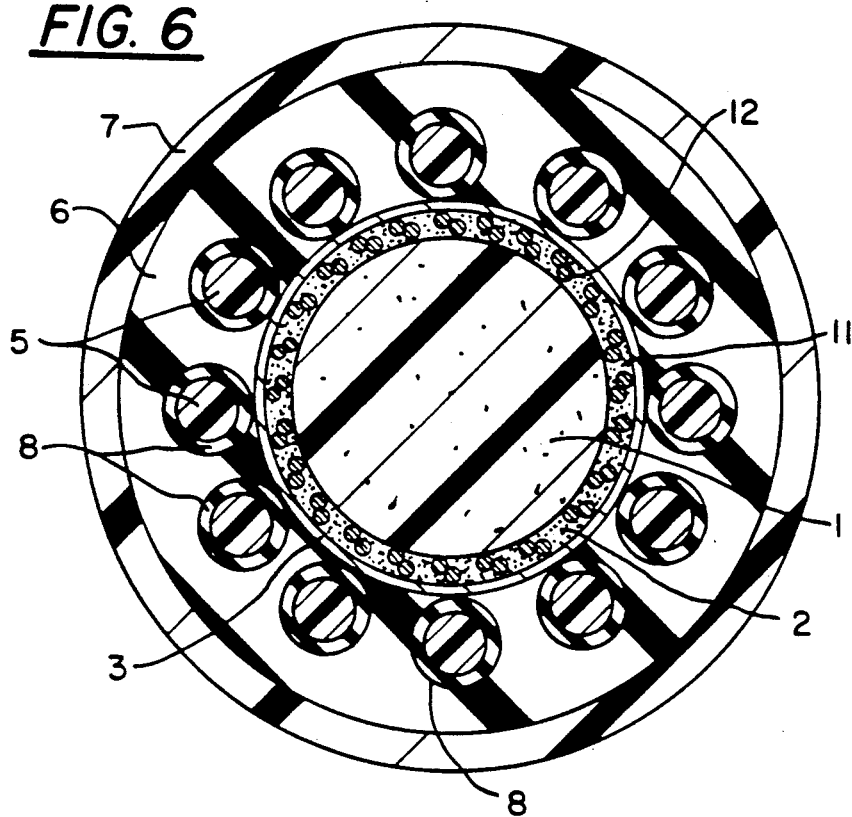
Figure 7:
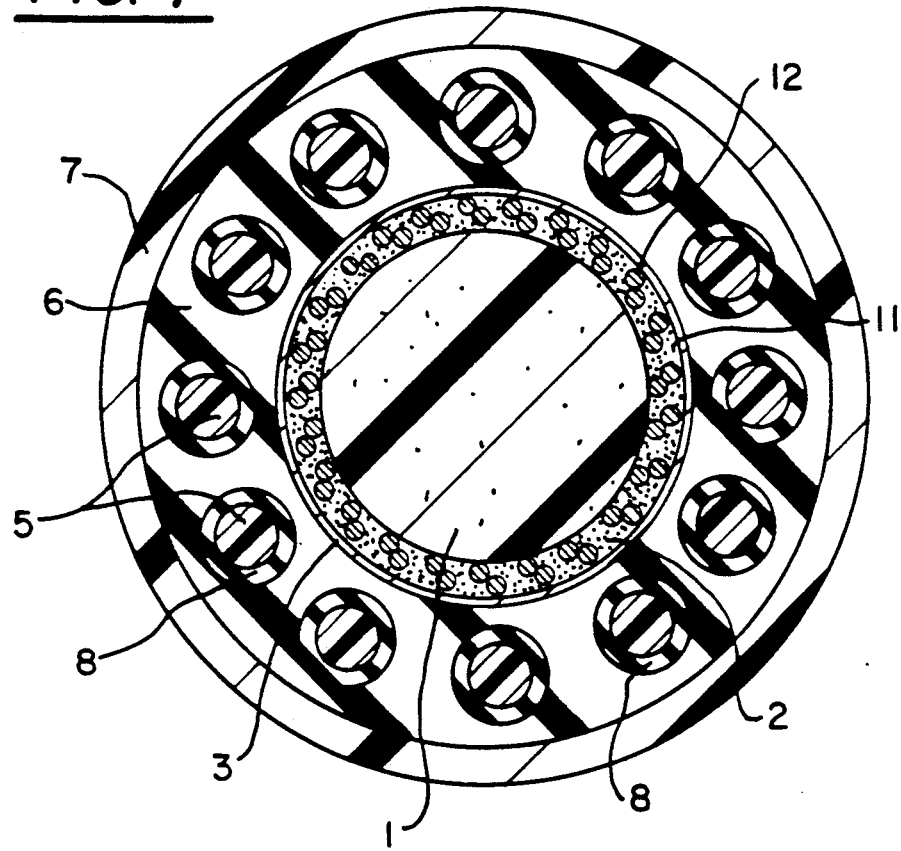

Referring to FIGS. 5, 6 and 7, it will be seen that again similar components exist, but, in FIG. 5, is shown an assembly corresponding generally to FIG. 3, with the exception that the strength members 5 are pre-coated by a spacing layer 8 before being formed around the first layer of thermo-plastic rubber, while in FIG. 6 an assembly is shown which omits the spacing layer 4, and the coating on the strength members may contact the wrap whereas, in FIG. 7, the strength members 5 are arranged on a larger radius to be supported in the inner jacket layer 6, away from the paper wrap 3.

The resultant streamer thus comprises an inner assembly consisting of a core 1 of a resilient buoyancy material over which is placed a data bearer layer 2 and the inner assembly so formed is protected by a sealing wrap 3 which may be made of paper, any voids in the assembly being filled with a gel 11 if necessary, the data bearer layer comprising braided signal transmission lines 12 as signal transmission means.

Directly over this assembly, but spaced therefrom, optionally by a spacing layer 4, are the strength members 5 which are embedded in the inner jacket layer 6, and these are located by being potted in the TPR inner jacket layer 6 and are prevented by this potting layer from being displaced when, for instance, the streamer is wound onto a bollard or the like.

The strength members 5 can be supported by any suitable means during the potting in the inner jacket layer 6, and, after application of the inner jacket layer 6 around the strength members 5, the polyurethane outer jacket layer 7 is applied by extruding it over the inner jacket 6.

It will, of course, be clear that the arrangement can be varied within the spirit of the invention. For instance the elliptical strength members 5 as shown in FIGS. 1 and 2 could be pre-coated with a spacing layer as shown for instance in FIGS. 5, 6 and 7, variations of this nature being within the spirit of the invention, which is directed to the particular arrangement of strength members in an inner jacket layer formed around an inner assembly and protected on the outer side by an outer jacket layer.

From the foregoing, it will be seen that the invention relates to improvements in and to towed streamers and to a method for manufacturing them, in which the towed Streamer may form a means of towing an array, or may form the array itself. The streamer may be of modular construction and may be used to tow an array.

I claim:

1. A towable streamer, comprising:
   a longitudinally extending buoyant core;
   a longitudinally extending data bearer layer perimetrically surrounding said buoyant core, and thereby defining, with said buoyant core, an inner assembly;
   a longitudinally extending inner jacket layer made of a resilient material, said inner jacket layer perimetrically surrounding said inner assembly;
   a longitudinally extending outer jacket layer perimetrically surrounding said inner jacket layer;
   a plurality of longitudinally extending strength members arranged in a series extending perimetrically around said inner assembly and embedded in said inner jacket layer, for transmitting tension longitudinally of said streamer; and
   spacing layer means made of resilient material; at least portions of said spacing layer means being located radially between said inner assembly and respective ones of said strength members, thereby spacing said strength members from said inner assembly.

2. The towable streamer of claim 1, wherein:
   said spacing layer means includes a respective spacing layer made of resilient material perimetrically surrounding each said strength member.

3. The towable streamer of claim 1, wherein:
   said spacing layer means includes a spacing layer made of resilient material perimetrically surrounding said inner assembly;
   said strength members engaging said spacing layer from radially outwardly of said spacing layer.

4. The towable streamer of claim 1, wherein:
   said inner assembly further includes a longitudinally extending paper wrap layer perimetrically surrounding said data bearer layer.

5. The towable streamer of claim 1, wherein:
   each said strength member is generally oval in transverse cross-sectional shape, so as to be thicker circumferentially of said streamer than radially of said streamer.

6. The towable streamer of claim 1, wherein:
   said inner assembly includes voids, and said towable streamer further includes a gel filling said voids.

7. The towable streamer of claim 4, wherein:
   said inner assembly includes voids, and said towable streamer further includes a gel filling said voids.

8. The towable streamer of claim 1, wherein:

said spacing layer means is made of thermoplastic material.

9. The towable streamer of claim 7, wherein:
said inner jacket is made of thermoplastic material.

10. A towable streamer, comprising:
a longitudinally extending buoyant core;
a longitudinally extending data bearer layer perimetrically surrounding said buoyant core;
a longitudinally extending wrap layer perimetrically surrounding said data bearer layer, and thereby defining, with said buoyant core and said data bearer layer, an inner assembly;
a longitudinally extending inner jacket layer made of a resilient material, said inner jacket layer perimetrically surrounding said inner assembly;
a plurality of longitudinally extending strength members arranged in a series extending perimetrically around said inner assembly and embedded in the inner jacket layer, for transmitting tension longitudinally of said streamer; and
spacing layer means made of resilient material; at least portions of said spacing layer means being located radially between said inner assembly and respective ones of said strength members, thereby spacing said strength members from said inner assembly.

11. The towable streamer of claim 10, wherein:
said strength members are spaced radially outwardly from said inner assembly at least partly by material of said inner jacket layer.

12. The towable streamer of claim 10, wherein:
said spacing layer means includes a respective spacing layer made of resilient material perimetrically surrounding each said strength member.

13. The towable streamer of claim 10, wherein:
each said strength member is generally oval in transverse cross-sectional shape, so as to be thicker circumferentially of said streamer than radially of said streamer.

14. The towable streamer of claim 10, wherein:
said inner assembly includes voids, and said towable streamer further includes a gel filling said voids; and
said inner jacket is made of thermoplastic material.

15. The towable streamer of claim 11, wherein:
said data bearer layer comprises a plurality of signal transmission lines.

16. A method for forming a towable streamer, comprising:
(a) providing a longitudinally extending buoyant core;
(b) perimetrically surrounding said buoyant core with a longitudinally extending data bearer layer and thereby defining an inner assembly;
(c) positioning a plurality of longitudinally extending strength members arranged in a series extending perimetrically around and in radially spaced relation to said inner assembly, for transmitting tension longitudinally of said streamer;
(d) while maintaining said strength members radially spaced from said inner assembly, forming a spacing layer means made of resilient material arranged so that at least portions thereof are located radially between said inner assembly and respective ones of said strength members;
(e) providing a longitudinally extending inner jacket layer perimetrically surrounding said strength members and in which said strength members are embedded; and
(f) perimetrically surrounding said inner jacket layer with a longitudinally extending outer jacket layer.

17. The method of claim 16, wherein:
step (d) comprises forming a respective spacing layer made of resilient material perimetrically surrounding each said strength member, prior to conducting step (e).

18. The method of claim 16, wherein:
prior to conducting step (c) strength members originally of substantially circular transverse cross-sectional shape are transversally flattened, so as to become generally oval in transverse cross-sectional shape, and in conducting step (c), these strength members are arranged so as to be thicker circumferentially of said streamer than radially of said streamer.

19. The method of claim 16, wherein:
said portions of said resilient material are made of thermoplastic material.

* * * * *